Figure 1:
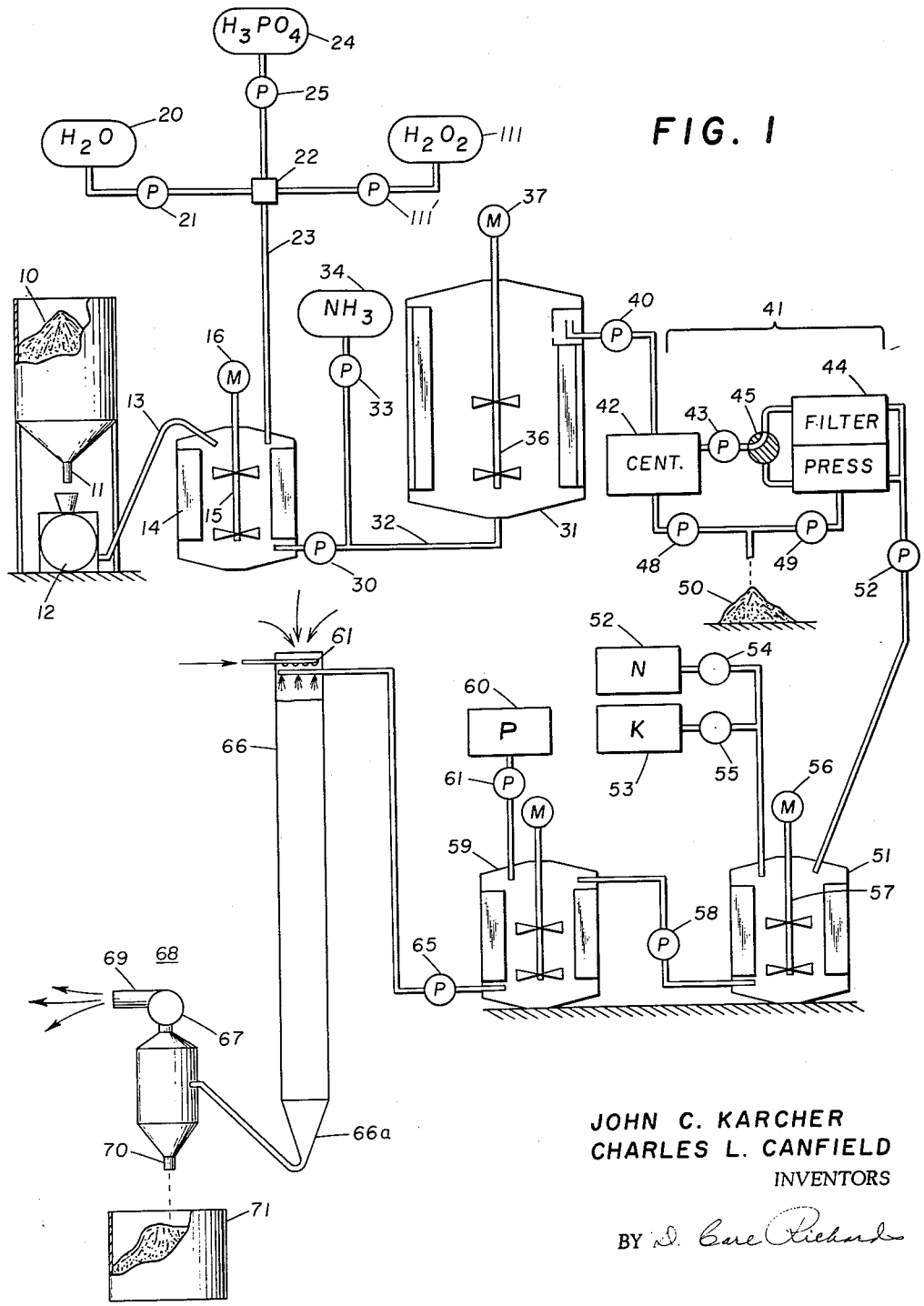

JOHN C. KARCHER
CHARLES L. CANFIELD
INVENTORS

United States Patent Office 3,111,404
Patented Nov. 19, 1963

3,111,404
METHOD OF FORMING A GRANULAR
AMMONIUM HUMATE FERTILIZER
John C. Karcher and Charles L. Canfield, both of Dallas,
Tex., assignors to Concho Petroleum Company, Dallas,
Tex., a corporation of Delaware
Filed Nov. 6, 1961, Ser. No. 150,446
7 Claims. (Cl. 71—24)

This invention relates to the treatment of humic acid-bearing ores and relates more particularly to the formation of an organic fertilizer.

Soil organic matter, and particularly soil humus, has a significant effect upon soil productivity. The soil organic matter consists of a series of products which range from undecayed plant and animal tissues through intermediate products of decomposition to fairly stable amorphous brown to black material bearing no trace of the anatomical structure of the material from which it is derived. The latter material is normally defined as soil humus although not defined as a single chemical composition.

Humic acid, the principal active chemical contributing to plant growth which is found in the humus content of most productive soils, serves among other things as an ion exchange medium in the soil for promoting growth processes. In average soils the humic acid content is no greater than one-half percent. In rich black soils, peat and high volatility coals and lignite, the humic acid content may rise to several percent.

It has been found that humic acid-bearing ores exist in substantial quantities. Beds of lignite have been found to have associated with them zones which, originally lignitic coal, have been subjected to oxidation by reason of exposure to the surface or their presence in near surface formations. As a result, a coal-like substance called leondardite has been formed which has a higher oxygen content, and is characterized by less compact structure, than lignite. Leonardite is less desirable as a fuel than lignite. However, it is relatively abundant and is a convenient source of humic acid. On the other hand, the availability of humic acid is substantial quantities has been dependent upon the development of successful and economic extraction procedures.

It is an object of this invention to provide for extraction of humic acid from lignitic materials such as leonardite and to form a fertilizer having a high concentration of humic acid. It is another object of this invention therefore to provide for the recovery of humic acid from its primary ores. A further object of the invention is to extract humic acid as an organic compound from its ores and combine such acid with other organic or inorganic fertilizer compounds to form a single fertilizer substance or complex substantially to meet all the nutrient requirements of plants for normal plant growth.

More particularly, in accordance with the present invention there is provided a method for forming a fertilizer which includes scrubbing a pulverized humic acid containing ore with phosphoric acid to react with metal ions therein. Thereafter, the resulting ore-acid slurry is ammoniated to form a colloidal dispersion of ammonium humate. From the colloidal dispersion, undissolved solids are filtered to produce a purified colloidal suspension. The latter is then dried to form granular humic acid fertilizer. In a preferred embodiment of the invention, nitrogen, phosphorous and potassium bearing compounds are added to the colloidal suspension to enhance the fertilizer.

For a more complete understanding of the present invention and for further objects and advantages thereof, reference may now be had to the following description taken in conjunction with the single FIGURE which is a schematic diagram of a system for forming a humic acid fertilizer from leonardite ore.

Referring now to the drawing, there is illustrated a stock pile of leonardite ore 10. The ore is derived from near surface deposits adjacent to more extensive lignite beds. It has been found that leonardite ore is present on the fringes of lignite beds where the latter have been exposed to the surface or are covered by a relatively thin overburden which, however, may be up to twenty-five feet or more in thickness. In such cases the exposure to the surface or near surface conditions has apparently caused oxidation of the lignite to form leonardite. The significant elemental difference between leonardite and lignite is the oxygen content thereof. Leonardite, for example, contains 28 to 29 percent oxygen whereas lignite contains 19 to 20 percent oxygen. The higher oxygen content of leonardite is due to the presence of a larger number of carboxylic acid groups therein. Thus leonardite is substantially more soluble in an alkali than is lignite. However, it has been recognized by applicants that, in the course of metamorphosis from lignite to leonardite many of the hydrogen ions in the humic acid are replaced by metal ions such as aluminum, iron and calcium. An agent such as ammonia which immediately appears feasible for use in extracting humic acid from leonardite is relatively weak. Ammonium ($NH_4^+$) ions in general will not displace the metal ions which have replaced hydrogen ions in humic acid. Therefore, in accordance with the present invention, the leonardite ore is pretreated to displace the metal ions and at the same time add to the system constituents which enhance the character of the ore in the sense of its ultimate use. The leonardite ore is conveyed through a suitable conveyor 11 to a pulverizer 12. The pulverizer 12 is a grinding mill with a classifier associated therewith such that there will be delivered to an output conveyor 13 pulverized ore of fineness to pass through screens of the range of from 80 to 300 mesh (U.S. sieve series). In one embodiment of the invention, the screen size of the effluent from the pulverizer and classifier 12 is 100 mesh.

Pulverized ore is then transported by the conveyor 13 to a pretreater or scrubber 14. In a preferred form of the invention, scrubber 14 comprises a closed tank in which there is provided an impeller or agitator 15 which is driven by a motor 16 to maintain a substantial circulatory motion of the materials therein. The scrubber 14 is fed by water from a tank 20 which is introduced by way of a metering pump 21 and a mixer 22, the output of which travels by way of conduit 23 to the interior of the scrubber 14. Thus the water and the pulverized ore under the action of the agitator 15 form a mineral-water slurry. To this slurry there is added orthophosphoric acid ($H_3PO_4$) from a storage tank 24 to serve as a pretreating agent.

Phosphoric acid is added in amounts sufficient to react completely with the metallic impurities, i.e., the compounds resulting from replacement of the hydrogen ions in the humic acid by metal ions in the leonardite ore. An excess of phosphoric acid, as much as 25% more than necessary, may be employed in order to make certain that recovery of humic acid will be at a maximum. The concentration of phosphoric acid issuing from mixer 22 after being mixed by weight of $H_3PO_4$ with water from tank 20 is of the order of from 1% to 5%. The acid concentration relative to ore in scrubber 14 will be about 2–5% for processing ore at a rate of about one ton per hour.

The acid is introduced by way of metering pump 25 to the mixer 22. The phosphoric acid reacts to remove the metal ions and they are replaced with hydrogen ions. The water and the phosphoric acid are mixed together in the mixer 22 so that they travel in solution through the conduit 23 into the scrubber 14. The ore and liquids introduced into the scrubber 14 are retained in the scrubber 14 for an average reaction period which is controlled by the input and extraction rates. Qualitatively, the reaction time in tank 14 will be adequate for the phosphoric acid to react with the metallic impurities in the ore to form metal phosphates. The reaction time will be somewhat dependent upon temperature. Temperatures will be in the range of 70° to 100° F. For particular values of throughput, reaction times will be hereinafter specified in greater detail. However, it is noted that the average residence time of ore in the scrubber 14 is of the order of an hour.

After the scrubbing operation has been completed, the ore-acid-water mixture is transferred as a slurry by way of pump 30 through line 32 into reaction chamber 31.

The phosphoric acid used for scrubbing the ore is a relatively weak acid as compared to hydrochloric acid or the like. The latter would serve adequately to remove the metal ions. However, since, in the present case, a fertilizer or soil building constituent is formed, the use of the phosphoric acid permits the retention of any excess acid in the final product to contribute to the formation of phosphates which in and of themselves are desirable constituents of fertilizer whereas the products of scrubbing by use of other acids would be less desirable. Hydrochloric acid would leave excess chlorine in the final product which is deleterious to plant growth. In contrast, not only does phosphoric acid contribute to formation of phosphates but the formation of ammonium phosphate has been found to accelerate the extraction of humic acid from the slurry.

Therefore, the use of a phosphoric acid in the scrubber 14 which permits the desired reaction materially enhances the humic acid recovery in the remaining portions of the system. Additionally, the use of the phosphoric acid introduces into the slurry desirable characteristics from the standpoint of ultimate use of the product. Further, the phosphoric acid eliminates the necessity of carrying out a washing step between the scrubber 14 and the reaction chamber 31, as would be necessary if hydrochloric acid were to be employed. Sulphuric acid and nitric acid both fall in the same general class as phosphoric acid insofar as they are compatible in a fertilizer. Neither, however, produces yields of humic acid comparable with that resulting from use of phosphoric acid.

The slurry line 32 leading from the pump 30 is connected by way of a metering pump 33 to a storage unit 34 containing anhydrous ammonia. The anhydrous ammonia delivered by pump 33 in the line 32 is metered to form a mixture in line 32. The slurry containing the ammonia is then introduced at the bottom into the reaction chamber 31. The concentration of ammonia in the mixture at the input to the chamber 31 is of the order of 3% to 10% by weight of $NH_3$. The pH of the slurry-ammonia mixture introduced into chamber 31 is of the order of 9.0 to 10.

The chamber 31 is provided with an impeller or agitator 36 which is driven by a motor 37 to maintain the aqueous ore-ammonia mixture in constant movement during its residence in the chamber 31. In order to place the humic acid in a colloidal dispersion by the ammonia, an average reaction reaction time of the order of five hours is satisfactory. The ammonia and ammonium phosphate formed in chamber 31 react with the slurry to extract humic acid from the slurry and form ammonium humate which is colloidally dispersed. Specific examples of reaction times for particular grades of products will hereinafter be set forth. For finer sizes of grind from the pulverizer 12, lower reaction times will be satisfactory whereas for coarser grinds a greater reaction time in the reaction chamber 31 will be necessary.

At the end of the reaction period a slurry, which now contains colloidally dispersed ammonium humate, is transferred by way of pump 40 from the reaction chamber 31, together with any undissolved components, into the purifier units 41.

The first purification stage includes a relatively low speed, high capacity centrifuge 42. Such devices are sometimes called "desludgers." In the alternative, a settling tank, the continuous flow form of which is called a "thickener," may be employed in the first stage. However, a centrifuge has been found to be desirable in that it will remove all of the solids having greater density than the colloidal dispersion. It will remove all but those particles having a density equal to or greater than about 1.1, the density of the colloidal dispersion. The centrifuge 42, in addition to carrying out a low speed operation, may include a second unit for developing higher centrifugal forces to extract less dense or smaller particles than extracted by a low speed centrifuge.

In order to remove further any undesired undissolved solids remaining in the slurry from the colloidally dispersed humates, the effluent from the centrifuge may be delivered by a pump 43 to a filter press unit 44. The filter press unit will include two separate flow channels to provide for alternate use and cleaning so that a continuous flow may be maintained through the system. For this purpose a three-way valve 45 is provided at the input to the filter press. The filter press unit 44 will then remove from the slurry any undissolved solids remaining after the centrifuge operation. The filter press unit 44 is designed to pass particles of size colloidally dispersed in the fluid. The larger insolubles are extracted in the form of a sludge or a soft cake. Waste material from the purifier unit is delivered by way of pumps 48 and 49 to a tailings pile 50.

Where the ore is relatively free from impurities or where a certain level of impurities can be tolerated in the product, the purification unit may be bypassed, in whole or in part, by suitable flow lines and valve means (not shown).

The effluent from the purifier units containing the purified ammonium humate (and the ammoniated acid) is pumped into a mixing vat 51 by way of pump 52. Preferably chemical compounds containing nitrogen, phosphorous, potassium and trace quantities of any other desired elements essential to plant growth are added from suitable storage sources either directly into the mixing vat 51 or in separate stages. In order to enhance the efficiency of the process, potassium and nitrogen containing compounds are added in a first mixing vat such as vat 51. To the resulting mixture a phosphorous containing compound is added along with any trace amounts of other elements that are desired. For this purpose there has been provided a storage unit 52 for a suitable nitrogen containing compound such as urea. A second storage unit 53 is provided for potassium containing compounds such as sulphate of potassium (potash) ($K_2SO_4$). Urea and potash are conveyed by way of metering units 54 and 55, respectively, into the vat 51 where they are thoroughly mixed with the colloidal dispersion by action of the motor 56 driving impeller or agitator 57.

The resultant mixture in vat 51 is then pumped by way of pump 58 into a second mixing vat 59. Into vat 59 phosphorous containing material such as phosphoric acid is introduced from storage tank 60. A metering pump 61 serves to introduce metered amounts of phosphoric acid into the mixture in the vat 59. Average mixing times in vats 51 and 59 are of the order of an hour. The reactions and constituent proportions are such that the pH of the effluent from tank 59 is of the order of 7.5 to 9.0.

Flow from tank 59 is effected by pump 65, delivering the mixture to the top of a drying tower 66. A fine spray of the mixture is produced at the top of the drying tower. Air heated by a burner unit 61 is drawn downward through the tower carrying the spray with it. Air flow in the tower 66 is maintained by a fan unit 67 forming a part of a separator 68. The air passing through the drying tower is exhausted to the atmosphere by way of the duct 69 whereas the dried solids collecting in the bottom 66a of the tower 66 are entrained in the air flowing to the separator 68 where the solids collected in the separator 68 travel to the bottom and out the channel 70 into a storage unit 71.

The rate of air flow, the amount of heat produced by combustion of fuel gas in burner 61, and the rate the mixture is sprayed into the tower are so controlled that the pH of the resultant materials collected in storage unit 72 is reduced from the range of about 7.5 to 9.0 at the input to the tower to between 7.5 and 6.2 and preferably between 6.7 to 6.5. Drying is controlled so that the material in the storage unit 72 will not cake or adhere and yet retain the maximum amount of nitrogen therein. Undue heating, reducing the moisture content such that the pH is below a level of about 6.2, substantially reduces the amount of nitrogen in the fertilizer, and decomposes soluble ammonium humate to insoluble humic acid. Thus, for best results drying is maintained at a minimum. The product deposited in the storage unit 71 is in the form of small pellets or a fine powder. It may then be treated as by pelletizing or compacting and granulating to form particles greater in size than those that would issue from the drier-separator unit 66–70.

In carrying out the present invention for the production of a standard fertilizer, i.e., one having nitrogen, phosphorous and potassium concentrations of 12%, 9% and 6%, respectively, and in addition is characterized by the fertilizer bulk being of the order of 40% ammonium humate, the following flow rates and parameters will be employed.

(1) Ore is delivered to the pulverizer 12 at the rate of 3,000 pounds per hour.

(2) Suffering a loss of about 5% per hour in the classifying operation in the pulverizer 12, 2850 pounds per hour are delivered to the scrubber 14 along with 173 pounds per hour of phosphoric acid (72% concentration). Also, 7,000 pounds per hour of water is delivered to the scrubber 14. The reaction period in the scrubber 14 is such that about 75% of the input is retained in scrubber 14 for a thirty minute period. Thus, the scrubber 14 has a volume of about three and one-half times the volume of the thirty-minute input to the scrubber.

(3) Following pretreatment, 10,000 pounds per hour of scrubbed materials are then delivered from the scrubber 14 to the reaction chamber 31 along with about 330 pounds per hour of aqueous ammonia. The reaction chamber 31 is larger in size than the scrubber 14, permitting retention for five hours of 75% of the input. Thus, the chamber 31 has a charge time at the input flow rate of about 20 hours.

(4) When on stream, 10,300 pounds per hour of slurry is delivered from the reaction chamber 31 to the purifier 41. The centrifuge 42 removes about 1,000 pounds per hour of undissolved solids whereas the filter press unit 44 removes about 500 pounds per hour, leaving a refined product delivered to the vat 51 of the order of 8,800 pounds per hour.

(5) The refined product is delivered to vat 51 by way of pump 52. Urea is then added at the rate of 500 pounds per hour along with 400 pounds of potash per hour. The mixing period of the product together with the added chemical compounds in vat 51 is of the order of one to three hours.

(6) The mixture is then delivered by way of pump 58 at a rate of 9,700 pounds per hour to the second vat 59 into which there is also introduced 415 pounds per hour of phosphoric acid.

(7) As a result, about 10,300 pounds of thoroughly mixed produce are delivered each hour to the drying tower 66 from which there is extracted about 7,000 pounds per hour of water and 3,300 pounds per hour of fertilizer. The fertilizer thus produced contains, upon analysis, 12% nitrogen, 9% phosphorus, 6% potassium and between 30% and 40% ammonium humate.

A set of parameters for the production of 16–8–4 fertilizer is as follows.

With an input feed of 1½ tons per hour and loss in the pulverizer 12 of 5%, 2,800 pounds per hour of ore are delivered to the scrubber 14 along with 6,500 pounds per hour of water and 160 pounds per hour of phosphoric acid (72%). As a result, about 9,500 pounds of ore-acid-water mixture is delivered to the reaction chamber 31 along with 310 pounds per hour of anhydrous ammonia. Continuous flow at the rate of about 9,800 pounds of slurry is then delivered to the centrifuge 42 with about 12% loss and about 4% loss in the filter press unit 44, leaving about 8,400 pounds per hour of refined product to be delivered to the vat 51. At this point 310 pounds of sulphate of potassium along with 850 pounds of urea are added per hour to form a fertilizer mixture which is then pumped into the vat 59 for the addition of 550 pounds per hour of phosphoric acid. As a result, 10,100 pounds per hour is delivered to the drying tower 66 from which there issues 6,700 pounds of water per hour along with 3,400 pounds per hour of, by analysis, 16–8–4 fertilizer containing about 36% ammonium humate.

In each case, the treatment of the ore with phosphoric acid provided a substantial increase in the yield of humic acid from leonardite ore and at the same time provided a constituent in the resultant acid-ore-water slurry contributive to the fertilizer properties of the resultant product. Eliminated is the necessity of washing the ore after scrubbing in order to avoid undesirable fertilizer constituents.

As above indicated, where the ore is of such nature that the purifier unit 41 may be bypassed, the operation is somewhat simplified. On the other hand, if the ore contains lignitic materials not fully oxidized to leonardite, then the materials extracted by the purifier may tend to increase to a prohibitive level. Within limits, the equality of the materials delivered from the scrubber 14 can be controlled by the addition of hydrogen peroxide ($H_2O_2$) from storage unit 111. Hydrogen peroxide is introduced by a suitable metering pump 111' to the mixing unit 22. The hydrogen peroxide may thus serve to upgrade leonardite during the scrubbing operation in the reactor 14.

This and other modifications may now suggest themselves to those skilled in the art and it is intended to cover such modifications as fall within the scope of the appended claims.

What is claimed is:

1. The method of forming a fertilizer which comprises the steps of:
    (a) crushing an ore containing humic acid and metal humates,
    (b) admixing the crushed ore with an aqueous solution containing between about 1% and 5% by weight of orthophosphoric acid to form a slurry,
    (c) maintaining said crushed ore admixed with said aqueous solution or orthophosphoric acid for a period of time of at least about one hour whereby said orthophosphoric acid replaces metal ions of said humates with hydrogen ions to form humic acid,
    (d) thereafter mixing anhydrousammonia with said slurry in an amount equal to about 4% to 15% by weight of said ore in said slurry,
    (e) agitating said slurry containing said ammonia for a period of time of at least five hours to effect reaction of humic acid with said ammonia to form colloidally dispersed ammonium humate in said slurry,
    (f) separating undissolved components of said ore from said slurry containing said colloidally dispersed ammonium humate, and
    (g) subjecting said slurry containing said colloidally dispersed ammonium humate to drying to obtain said ammonium humate in granular form.

2. The method of forming a fertilizer which comprises the steps of:
   (a) crushing leonardite ore containing humic acid and metal humates to a fineness to pass through screens between 80 and 300 mesh (U.S. sieve series),
   (b) admixing the crushed ore with an aqueous solution containing between about 1% and 5% by weight of orthophosphoric acid to form a slurry,
   (c) maintaining said slurry in a reaction zone for a period of time of at least about one hour whereby said orthophosphoric acid replaces said metal ions of said humates in said ore with hydrogen ions to form humic acid,
   (d) thereafter mixing anhydrous ammonia with said slurry in an amount equal to about 4% to 15% by weight of the ore in the slurry,
   (e) agitating said slurry containing said ammonia for a period of time of at least about 5 hours to effect reaction of humic acid with said ammonia to form colloidally dispersed ammonium humate in said slurry,
   (f) separating undissolved components of said ore from said slurry containing said colloidally dispersed ammonium humate, and
   (g) subjecting said colloidally dispersed ammonium humate to drying to obtain said ammonium humate in granular form.

3. The method of forming a fertilizer which comprises the steps of:
   (a) crushing leonardite ore containing humic acid and metal humates to a fineness to pass through screens between 80 and 300 mesh (U.S. sieve series),
   (b) admixing the crushed ore with an aqueous solution containing between about 1% and 5% by weight of orthophosphoric acid to form a slurry,
   (c) maintaining said slurry at a temperature between about 70° and 100° F. for a period of time of at least about one hour whereby said orthophosphoric acid replaces metal ions of said humates with hydrogen ions to form humic acid,
   (d) thereafter mixing anhydrous ammonia with said slurry in an amount equal to about 4% to 15% by weight of the ore in the slurry,
   (e) agitating said slurry containing said ammonia for a period of time of at least about 5 hours to effect reaction of humic acid with said ammonia to form colloidally dispersed ammonium humate in said slurry,
   (f) separating undissolved components of said ore from said slurry containing said colloidally dispersed ammonium humate, and,
   (g) subjecting said colloidally dispersed ammonium humate to drying to obtain said ammonium humate in granular form.

4. The method of forming a fertilizer which comprises the steps of:
   (a) crushing an ore containing humic acid and metal humates,
   (b) admixing the crushed ore with an aqueous solution containing between about 1% and 5% by weight of orthophosphoric acid to form a slurry,
   (c) maintaining said slurry at a temperature between 70° and 100° F. for a period of time of at least about one hour whereby said orthophosphoric acid replaces metal ions of said humates with hydrogen ions to form humic acid,
   (d) thereafter mixing anhydrous ammonia with said slurry in an amount equal to about 4% to 15% by weight of the ore in the slurry,
   (e) agitating said slurry containing said ammonia for a period of time of at least about 5 hours to effect reaction of humic acid with said ammonia and form colloidally dispersed ammonium humate in said slurry,
   (f) adding potash, urea, and orthophosphoric acid in predetermined amounts to said slurry to enrich said colloidally dispersed ammonium humate in nutritive fertilizer constituents,
   (g) separating undissolved components of said ore from said slurry containing said colloidally dispersed ammonium humate, and
   (h) subjecting said slurry containing said enriched colloidally dispersed ammonium humate to drying to obtain said ammonium humate in granular form.

5. The method of forming a fertilizer which comprises the steps of:
   (a) crushing leonardite ore containing humic acid and metal humates to a fineness to pass through screens between 80 and 300 mesh (U.S. sieve series),
   (b) admixing the crushed ore with an aqueous solution containing between about 1% and 5% by weight of orthophosphoric acid to form a slurry,
   (c) maintaining said slurry at a temperature between 70° and 100° F. for a period of time of at least about one hour whereby said orthophosphoric acid replaces metal ions of said humates with hydrogen ions to form humic acid,
   (d) thereafter mixing anhydrous ammonia with said slurry in an amount equal to about 4% to 15% by weight of said ore in said slurry,
   (e) agitating said slurry containing said ammonia for a period of time of at least about 5 hours to effect reaction of humic acid with said ammonia and form colloidally dispersed ammonium humate in said slurry,
   (f) adding potash, urea, and orthophosphoric acid in predetermined amounts to said slurry to enrich said colloidally dispersed ammonium humate in nutritive fertilizer constituents,
   (g) separating undissolved components of said ore from said slurry containing said colloidally dispersed ammonium humate, and
   (h) subjecting said slurry containing said enriched colloidally dispersed ammonium humate to drying to obtain said ammonium humate in granular form.

6. The method of forming a fertilizer which comprises the steps of:
   (a) crushing an ore containing humic acid in which hydrogen ions thereof have been replaced by metal ions from the group of the aluminum, iron, and calcium ions, to form the corresponding humate,
   (b) admixing the crushed ore with an aqueous solution of orthophosphoric acid to form a slurry,
   (c) maintaining said crushed ore admixed with said aqueous solution of orthophosphoric acid whereby said orthophosphoric acid replaces said metal ion of said humate with hydrogen ion to form humic acid,
   (d) thereafter mixing ammonia with said slurry whereby said ammonia reacts with said humic acid to form colloidally dispersed ammonium humate in said slurry,
   (e) separating undissolved components of said ore from said slurry containing said colloidally dispersed ammonium humate, and
   (f) subjecting said slurry containing said colloidally dispersed ammonium humate to drying to obtain said ammonium humate in granular form.

7. The method of forming a fertilizer which comprises the steps of:
   (a) crushing an ore containing humic acid in which hydrogen ions thereof have been replaced by metal ions from the group of the aluminum, iron, and calcium ions, to form the corresponding humate,
   (b) admixing the crushed ore with an aqueous solution of orthophosphoric acid to form a slurry, (c) maintaining said crushed ore admixed with said aqueous solution of orthophosphoric acid whereby said orthophosphoric acid replaces said metal ion of said humate with hydrogen ion to form humic acid,
(d) thereafter mixing ammonia with said slurry whereby said ammonia reacts with said humic acid to form colloidally dispersed ammonium humate in said slurry, and
(e) subjecting said slurry containing said colloidally dispersed ammonium humate to drying to obtain said ammonium humate in granular form.

References Cited in the file of this patent

UNITED STATES PATENTS

| | | |
|---|---|---|
| 1,584,130 | Pease | May 11, 1926 |
| 1,858,230 | Walton et al. | May 10, 1932 |
| 2,093,047 | Hudig et al. | Sept. 14, 1937 |
| 2,985,643 | Boomer et al. | May 23, 1961 |
| 2,992,093 | Burdick | July 11, 1961 |

FOREIGN PATENTS

| | | |
|---|---|---|
| 192,778 | Great Britain | Feb. 8, 1923 |